Dec. 1, 1970  T. W. RUNDELL  3,544,240
HERMETIC MOTOR-COMPRESSOR UNIT
Filed Sept. 24, 1968  2 Sheets-Sheet 1

INVENTOR
THEODORE W. RUNDELL

BY
Barnes, Kisselle, Raisch & Choate

ATTORNEYS

Dec. 1, 1970  T. W. RUNDELL  3,544,240
HERMETIC MOTOR-COMPRESSOR UNIT
Filed Sept. 24, 1968  2 Sheets-Sheet 2

INVENTOR
THEODORE W. RUNDELL

BY Barnes, Kisselle, Raisch & Choate

ATTORNEYS

United States Patent Office 3,544,240
Patented Dec. 1, 1970

3,544,240
HERMETIC MOTOR-COMPRESSOR UNIT
Theodore W. Rundell, Tecumseh, Mich., assignor to Tecumseh Products Company, Tecumseh, Mich., a corporation of Michigan
Filed Sept. 24, 1968, Ser. No. 762,105
Int. Cl. F04b 35/04, 39/02
U.S. Cl. 417—416        7 Claims

ABSTRACT OF THE DISCLOSURE

A hermetic motor-compressor unit with a motor stator encapsulated in a cast metallic body to provide a mounting for both the rotor of the compressor motor and the cylinder block of the compressor. The body is cast with pockets to receive and retain bearing assemblies in which the rotor is journalled. The hermetic housing of the unit comprises a tube with end caps connected thereto, and the stator is is shrink or press-fitted into the tube to mount the motor and compressor assembly within the housing.

---

This invention relates to hermetic motor-compressor units.

An object of this invention is to provide a hermetic motor-compressor unit which does not require a conventional separate frame or mounting base for the motor and compressor, and which uses die cast components to reduce machining and fabrication costs.

Other objects as well as the features and advantages of the invention will become apparent from the accompanying description and drawings in which.

Figure 1:
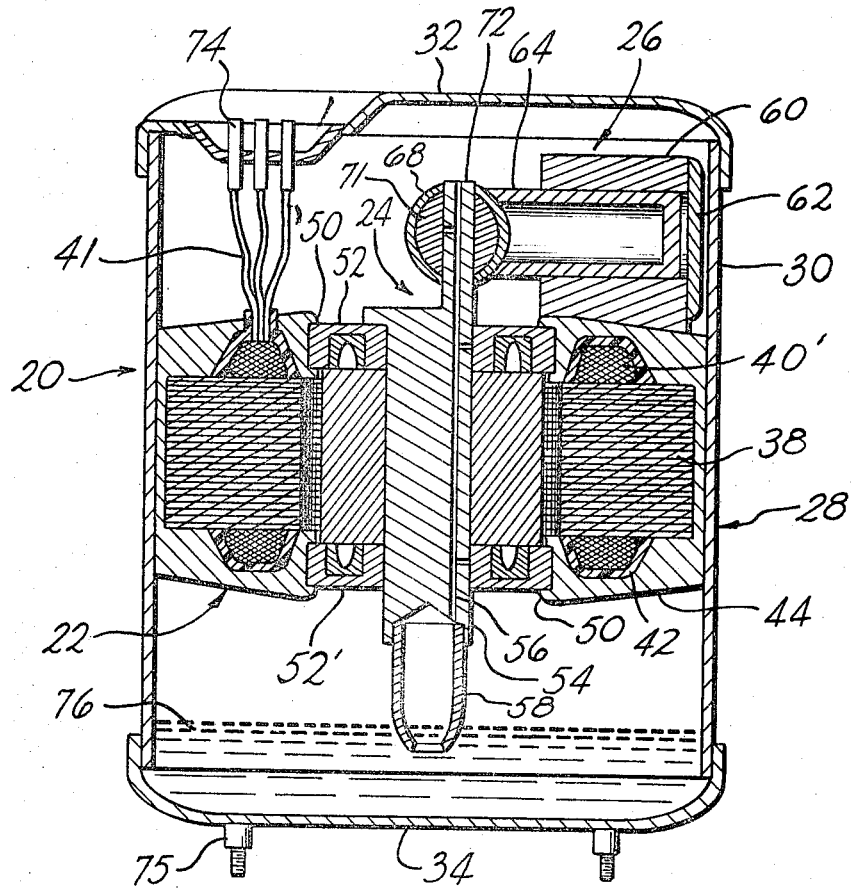
FIG. 1 is a vertical center section of a motor-compressor unit of this invention.

Referring in more detail to the accompanying drawings, FIG. 1 shows by way of a preferred example a hermetic motor-compressor unit 20 of the present invention which is made up of a motor stator 22, a rotor 24 journalled in the stator and a single cylinder piston type compressor 26, all of which are enclosed within a hermetically sealed housing or casing 28. Housing 28 preferably is made from a cylindrical metal tube 30 with metallic end caps 32 and 34 each having a flange portion telescopically overlapping an end of and welded to tube 30

In accordance with a principal feature of the present invention, the normally exposed end turns of the field windings of a conventional motor stator are encased or capsulated by a thermal insulating material, and then the complete stator is encapsulated within a cast body, preferably one die cast of metal such as zinc or aluminum. The zinc or aluminum casting encasing the stator is cored during casting to provide suitable pockets for carrying bearings or journals for the rotor of the compressor motor. The casting also provides a strong, rigid frame to which the stationary parts of the compressor are attached.

Figure 2:
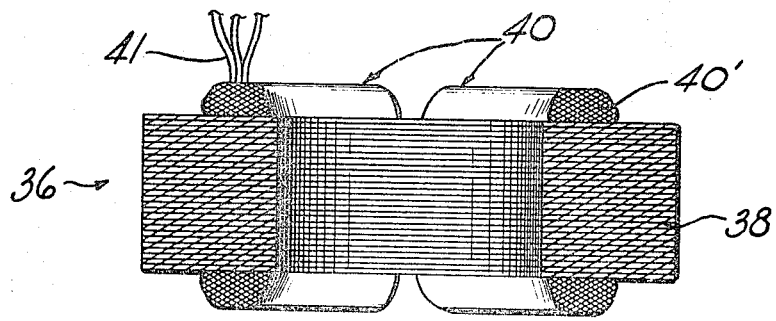
FIG. 2 is a vertical center section of a motor stator subassembly prior to encapsulation in accordance with this invention.
Figure 3:
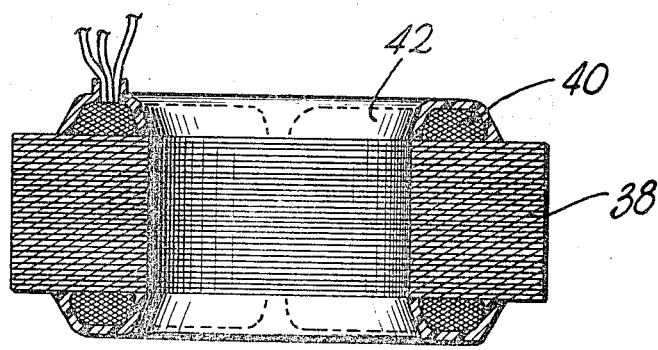
FIG. 3 is a vertical center section of the motor stator of FIG. 2 after the end turns of the stator windings have been encapsulated in a thermally insulating material.
Figure 4:
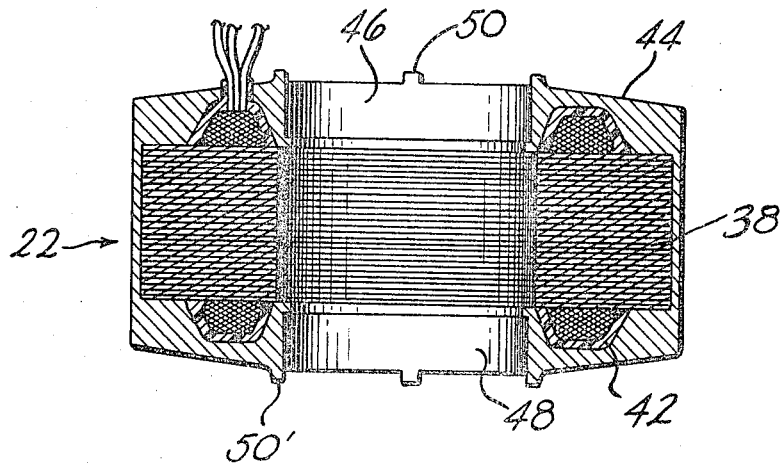
FIG. 4 is a vertical center section of the stator of FIG. 3 after the stator has been further encapsulated in a metallic die cast body.

As shown sequentially in FIGS. 2, 3 and 4, stator 22 is built up from a conventional stator subassembly 36 consisting of the usual laminated stack of iron core plates 38 and field windings or coils 40, having their end turns 40' exposed and projecting beyond the axially opposite ends of stator laminations 38. The usual lead wires 41 are suitably connected to coils 40. The exposed end turns 40' of the field coils which are shown exposed in FIG. 2 are enclosed as shown in FIG. 3 in a thermally and electrically insulative material 42, such as a polyamide polymer plastic. Preferably the plastic insulating material is applied by a suitable injection molding machine. Alternatively, material 42 may comprise fibrous glass materials as disclosed in U.S. Pat. No. 2,548,133. After material 42 has cured, the encased field coils and all but the inner periphery of core 38 are encapsulated in a metallic body 44 (FIG. 4). This operation is preferably performed in a die casting machine adapted for high production automated operation. If desired, the plastic encapsulation step of FIG. 3 and the die casting step of FIG. 4 may be performed sequentially on a single multi-station machine. Body 44 is formed with two annular coaxial recesses 46 and 48 each having outwardly extending tabs 50 which provide pockets for carrying rotor bearings as described hereinafter.

Figure 5:
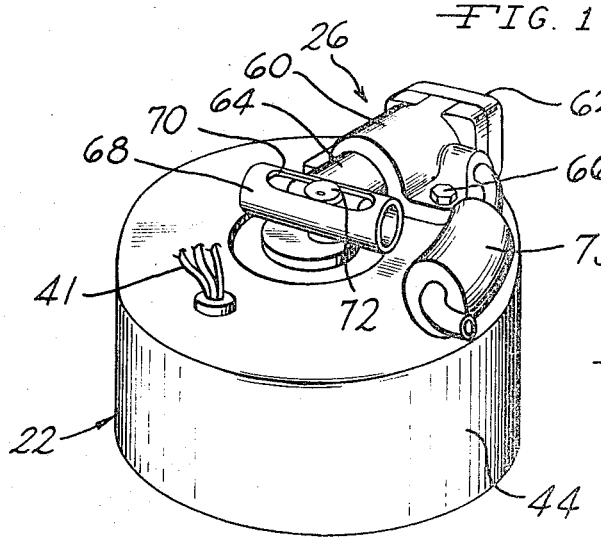
FIG. 5 is a perspective view of the motor and compressor subassembly of FIG. 1 shown by itself separate from the housing and illustrating the mounting of the cylinder block and muffler on the stator and a scotch yoke drive which connects the compressor piston to the rotor of the motor.

As shown in FIG. 1, rotor 24 is formed with a central drive shaft 54 having lubricant passages 56 therein and a centrifugal oil pump in the form of an oil pickup tube 58 mounted in the lower portion of the shaft and connected to passages 56. Shaft 54 is journalled in bearing assemblies 52 and 52' which in turn are seated respectively in pockets 46 and 48, tabs 50 and 50' being staked over the associated assemblies 52 and 52' to secure them in the pockets. As shown in FIG. 5, compressor 26 comprises a cylinder block 60 having a valve and manifold head 62 secured to the block, the block being mounted on the upper end of stator 22 by two bolts 66. Block 60 does not have a crankcase and only provides a mounting for head 62 and a cylinder for slidably receiving a piston 64 therein. For economy of manufacture, piston 64 can be cold extruded and cylinder block 60 and head 62 can be die cast. Piston 64 is reciprocated in response to rotation of shaft 54 through a scotch yoke comprising a tube 68 with two slots 70 positioned transverse to piston 64, the tube being fixed to the exposed end of the piston. The upper portion of rotor shaft 54 is formed with a cylindrical crankpin 72 which is eccentric to shaft 54 and extends through slots 70 in tube 68 and through a slider 71 in the tube. A suitable discharge muffler 73 is connected to the compressor outlet in block 60.

As shown in FIG. 1, the self-contained assembly of stator 22, rotor 24 and compressor 26 is mounted in tube 30 by either pressing or shrink-fitting body 44 of stator 22 into tube 30. After the complete assembly is mounted in tube 30, leads 41 are connected to glass terminals 74 mounted in top cap 32 which is welded to tube 30. Bottom cap 34 with mounting studs 75 is then welded to tube 32 to form an oil reservoir 76 in the lower part of housing 28.

The cast metal body 44 of stator 22 provides a structure with adequate strength and dimensional stability to serve as a base or frame for mounting both the rotor 24 and compressor 26, thereby eliminating the expensive cast iron, precision machined mounting frame of conventional hermetic motor-compressor units. The press or shrink mounting of the self-contained stator rotor and compressor assembly in the tube 30 provides good heat transfer from the compressor to the housing and this mounting as well as the fabrication of the outer shell from a piece of tubing and readily stamped end caps further reduces the cost of manufacture and assembly of unit 20. The use of die cast and stamped components, and the welding, die forming and staking processes also contributes to the economy of manufacture of this unit and provides a structure which can be readily assembled by automated equipment.

In the foregoing description, various details of construction, such as the suction and discharge connections, valving and manifold arrangement, motor construction and circuitry have been omitted for the sake of clarity and brevity, the same being well understood by those skilled in the art.

I claim:

1. A hermetic electric motor-compressor unit comprising:
   (a) a frame comprising a body of cast material having an electric motor stator with a field winding and a core cast in said frame with said winding and core completely engulfed at the axially opposite ends and outer periphery thereof in said body,
   (b) an electric motor rotor carried by said frame and journalled for free rotation with respect to said stator,
   (c) a reciprocating piston and cylinder compressor pump having a fixed part and a moving part, said fixed part being fixedly secured to said body to be carried by said frame and said moving part being connected to said rotor to be driven thereby, and
   (d) a housing hermetically enclosing said stator, rotor and compressor with said stator being supported by said housing.

2. The unit as defined in claim 1 in which said frame body is a heat conductive metallic die casting and said field winding has end turns projecting from said stator core, said end turns being covered by a layer of thermally and electrically insulated material disposed between and in intimate contact with said end turns and said cast material, said fixed part of said pump being axially aligned with said core and said end turns.

3. A hermetic electric motor-compressor unit comprising:
   (a) a frame having an electric motor stator with a field winding and a core cast in said frame,
   (b) an electric motor rotor carried by said frame and journalled for free rotation with respect to said stator,
   (c) a compressor fixedly carried by said frame and connected to said rotor to be driven thereby, and
   (d) a housing hermetically enclosing said stator, rotor and compressor with said stator being supported by said housing,
said frame comprising a metallic casting and said field winding having end turns projecting from said stator core, said end turns being covered by a layer of thermally and electrically insulating material disposed between said end turns and said casting, said frame having at least two bearing seats cast therein and said rotor being journalled to said casting by bearing assemblies mounted in said seats.

4. A hermetic electric motor-compressor unit comprising:
   (a) a frame having an electric motor stator with a field winding and a core cast in said frame,
   (b) an electric motor rotor carried by said frame and journalled for free rotation with respect to said stator,
   (c) a compressor fixedly carried by said frame and connected to said rotor to be driven thereby, and
   (d) a housing hermetically enclosing said stator, rotor and compressor with said stator being supported by said housing,
said frame comprising a metallic casting and said field winding having end turns projecting from said stator core, said end turns being covered by a layer of thermally and electrically insulating material disposed between said end turns and said casting, said compressor comprising a cylinder block mounted on said casting and a piston carried by said block for reciprocal movement within said block when driven by said rotor.

5. The unit as defined in claim 4 in which said frame is mounted within said housing by said frame firmly engaging a portion of said housing.

6. The unit as defined in claim 4 in which said housing comprises a metallic tube and two metallic caps, said caps being connected to opposite ends of said tube, and said frame has a cylindrical outer periphery engaging a cylindrical inner peripheral portion of said tube.

7. The unit as defined in claim 6 wherein said frame comprises an annular die cast aluminum body covering the outer periphery and the axially opposite ends of said stator.

References Cited

UNITED STATES PATENTS

| | | | |
|---|---|---|---|
| 2,239,723 | 4/1941 | Limpert et al. | 230—58 |
| 3,060,335 | 10/1962 | Greenwald | 103—87 |
| 3,276,382 | 10/1966 | Richter | 103—87 |

ROBERT M. WALKER, Primary Examiner

U.S. Cl. X.R.

230—206; 310—90